United States Patent [19]
Johnson

[11] Patent Number: 5,660,408
[45] Date of Patent: Aug. 26, 1997

[54] GLADHAND AND ELECTRICAL CONNECTOR HOLDER

[75] Inventor: Douglas P. Johnson, Kent, Wash.

[73] Assignee: PACCAR Inc, Bellevue, Wash.

[21] Appl. No.: 501,550

[22] Filed: Jul. 12, 1995

[51] Int. Cl.$^6$ ...................................................... B60D 1/62
[52] U.S. Cl. .............................................. 280/420; 248/75
[58] Field of Search ................................... 280/420, 421, 280/422; 248/75

[56] References Cited

U.S. PATENT DOCUMENTS

| | | | |
|---|---|---|---|
| 3,482,203 | 12/1969 | Whitright | 280/422 |
| 4,092,034 | 5/1978 | Becker | 280/420 |
| 4,278,226 | 7/1981 | Horowitz | 248/314 |
| 4,366,965 | 1/1983 | Rhodes | 280/421 |
| 4,772,220 | 9/1988 | Hallier, Jr. | 439/528 |
| 4,940,427 | 7/1990 | Pearson | 439/501 |
| 5,082,217 | 1/1992 | Parker et al. | 248/75 |
| 5,143,392 | 9/1992 | Collins | 280/420 |

*Primary Examiner*—Kevin Hurley
*Attorney, Agent, or Firm*—Seed and Berry L.L.P.

[57] ABSTRACT

A storage device for storing gladhands and an electrical connector of a truck or other vehicle that has pneumatic lines with the gladhands thereon and an electrical line with the electrical connector thereon. The storage device includes a housing having a plurality of sidewalls that define a storage area sized to receive the gladhands and electrical connector. The housing has an open side providing access to the storage area, and one of the plurality of sidewalls has an elongated slot therein that is sized to receive the pneumatic and electrical lines when the gladhands and electrical connector are positioned in the storage area. The slot has an open receiving end at the open end portion of the housing to allow the pneumatic and electrical lines to move into and out of the slot. The slot has a width dimension that is smaller than the gladhands and electrical connector to prevent the gladhands or electrical connector from moving through the slot and out of the housing. A retaining device is connected to the housing to removably retain the gladhands and electrical connector within the storage area.

17 Claims, 2 Drawing Sheets

5,660,408

GLADHAND AND ELECTRICAL CONNECTOR HOLDER

TECHNICAL FIELD

The present invention relates to truck and trailer pneumatic and electrical lines that extend between a truck cab and a trailer, and more particularly the invention relates to a holding device for storing and retaining the gladhands and electrical connector on the pneumatic and electrical lines, respectively, when the trailer is disconnected from the truck cab.

BACKGROUND OF THE INVENTION

In a conventional trailer truck, the truck cab is connected to the trailer and two pneumatic lines from the truck cab are connected to two pneumatic lines of the trailer. Similarly, at least one electrical line from the truck cab is connected to the electrical line of a trailer. The pneumatic lines provide pressurized air to the trailer's brakes and other pneumatic components of the trailer. The electric line provides electricity to the lights and other electrical components of the trailer. The pneumatic lines of the truck cab and trailer are releasably connected together by gladhands and the electrical line is connected by electrical connectors, such as a plug and receiving socket configuration. When the truck cab is separated from the trailer, the gladhands of the pneumatic lines are separated and the electrical connector on the electrical line is also separated. When separated from the trailer, the gladhands and electrical connector must be stored so the pneumatic and electrical lines do not hang or lay loose during the operation of the truck cab.

Bracket assemblies have been used to retain the gladhands and/or electrical connector when the trailer is separated from the truck cab. As an example, U.S. Pat. No. 4,278,226 discloses a holding bracket for an electrical plug that provides for secure retention of the electrical plug. However, the electrical plug must be pushed into the bracket until a spring is compressed and then twisted to align a keyway with a pilot guide. This push and twist connection between the electrical connector and the bracket can be difficult, awkward, and time consuming when storing the electrical connector. In addition, the holding bracket retains only the electrical plug and does not receive the gladhands. Accordingly, multiple brackets are required for retention of the vehicle's electrical plug and gladhands.

In U.S. Pat. No. 4,366,965, a gladhand and plug keeper is disclosed as a single bracket mounted to a truck, and the keeper is adapted to retain the electrical plug and the gladhands when separated from the trailer. The keeper is a one-piece structure that includes a pair of gladhand receptacle members and a plug receptacle member. The plug receptacle member comprises a vertically disposed socket between the pair of gladhand receptacle members. Each of the gladhand receptacle members has an inverted J-shape that defines a receiving groove, and the long leg of the J-shape member has a partially spherical protuberance thereon. The receiving groove receives an upper tongue of the gladhand. The gladhands must be connected and disconnected by a twisting motion into or out of the mating gladhand receptacle. The process of aligning the gladhand in the gladhand receptacle and rotating the gladhand until it is locked requires alignment of the gladhand's tongue with the receiving groove, and the annular seal with the protuberance. Such an alignment process is relatively time-consuming and can be difficult and frustrating, for example, when the weather is bad or there is insufficient light.

Accordingly, '965 patent teaches holding receptacles for each of the gladhands and the electrical plug. Such multiple storage components increase the time and cost for manufacturing the storage device and increase the complexity of storing and containing the gladhands and the electrical connectors of the vehicle. A further drawback to the keeper disclosed in the '965 patent is that the keeper does not provide sufficient protection of the gladhands or the electrical plug against damage during operation of the truck or against exposure to dirt, dust, grime, and water, that can damage the gladhands or electrical connectors.

SUMMARY OF THE INVENTION

The present invention provides a storage device for temporarily storing one or more gladhands and one or more electrical connectors of a vehicle. The storage device provides protection to the gladhands and the electrical connector, and it provides for an easy, quick, and time-efficient manner of storing the gladhands and electrical connector when separated from the trailer's mating components. The storage device also provides for easy and quick removal of the gladhands and electrical connector from the storage device when the pneumatic and electrical lines are to be connected to a trailer or the like.

In a preferred embodiment of the present invention, the storage device includes a housing having a plurality of sidewalls that define a storage area sized to receive a gladhand and an electrical connector therein. The housing has an open end portion that provides access to the storage area. One of the plurality of sidewalls has an elongated slot shaped and sized to receive the pneumatic and electrical lines when the gladhand and electrical connector are positioned in the storage area. The width of the slot is smaller than the width of the gladhand and the electrical connector so neither of them can fall through the slot and out of the storage area. The slot has an open receiving end at the open end portion of the housing to allow the pneumatic and electrical lines to move into and out of the slot when the gladhand and electrical connector are moved into and out of the housing. A retaining device is connected to the housing and is positionable to removably retain the gladhand and electrical connector in the storage area.

In the preferred embodiment of the invention, the housing is a box-like structure having a longitudinal axis that extends parallel to the slot and through the open end portion of the housing. The slot is formed in the bottom side of the housing, and the housing is mountable to the vehicle's mounting surface with the housing's longitudinal axis being substantially horizontal. The retaining device of this preferred embodiment is an elastomeric strap attached at one end to one side of the housing, and the strap extends across the open end portion. The opposite end of the retaining strap is removably positioned in a notch formed in the opposing side of the housing. Accordingly, the retaining strap is securable in the closed position during operation of the vehicle, thereby blocking the gladhands and electrical connector from moving out of the storage device.

The present invention also is directed toward a method of storing a gladhand on a pneumatic line of a truck or an electrical connector on an electric line that is connected to a corresponding pneumatic or electric line on a trailer that is towable by the truck cab. The preferred method includes the steps of disconnecting the gladhand from a mating gladhand receiver on the trailer, and moving the gladhand into the housing of the storage device through the open end and moving the pneumatic line along the slot of the housing to position the gladhand within the interior area of the housing with the pneumatic line extending away from the gladhand through the slot and away from the interior area of the housing. The preferred method also includes the steps of disconnecting the electrical connector from a mating receiver of the trailer and moving the electrical connector into the housing through the open end and moving the electrical line along the slot to position the electrical connector within the interior area of the housing such that the electrical line extends away from the electrical connector and through the slot away from the interior area of the housing.

DETAILED DESCRIPTION OF THE INVENTION

Figure 1:
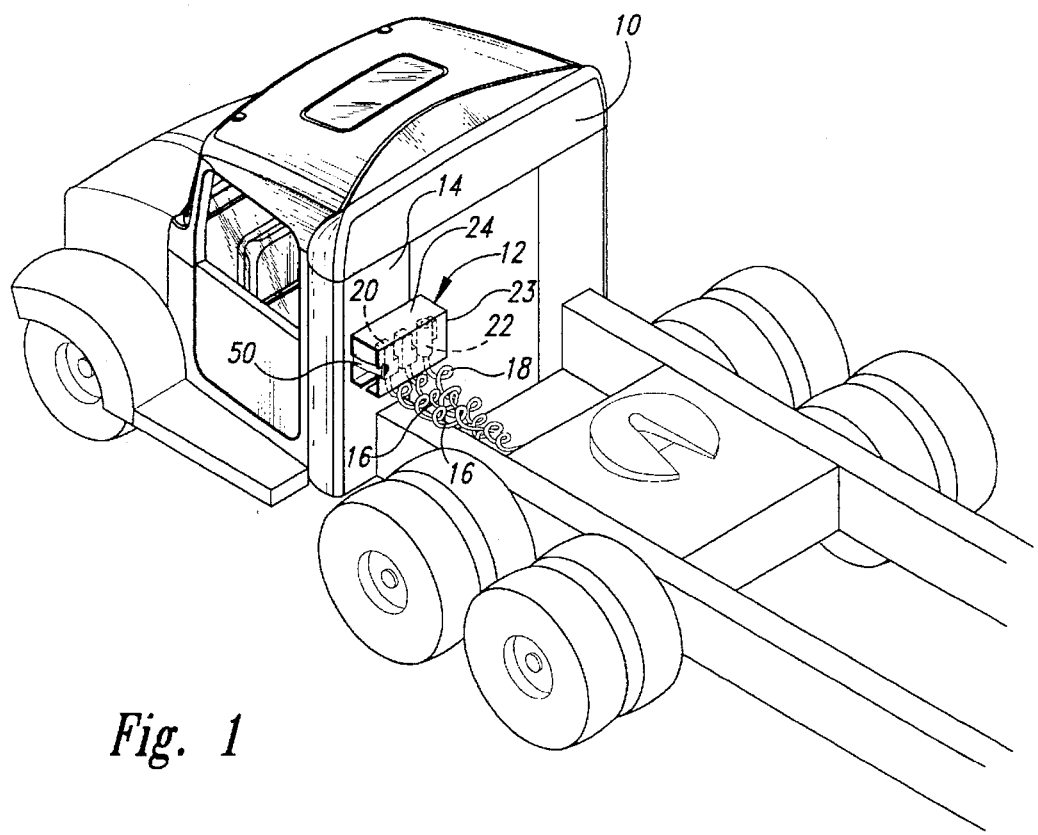
FIG. 1 is an isometric view of a truck cab having pneumatic and electrical lines thereon and having a storage device in accordance with the present invention removably retaining the gladhands and electrical connector of the respective pneumatic and electrical lines.

A truck cab 10 of a conventional tractor trailer type is illustrated in FIG. 1 having a gladhand and electrical connector storage device 12 in accordance with the present invention mounted to a mounting surface 14 on the rear side of the truck cab. The truck cab 10 includes pneumatic lines 16 that are connected to the truck's pneumatic system, and an electrical line 18 that is connected to the truck's electrical system. The pneumatic lines 16 terminate at a gladhand 20, illustrated in hidden lines, within the storage device 12, and the electrical line 18 terminate at an electrical plug 22, also shown in hidden lines, within the storage device 12. The gladhands 20 are conventional pneumatic connectors that are adapted to connect to mating gladhand receivers on a trailer (not shown) to provide pressurized air to the pneumatic systems of the trailer. The electrical plug 22 is adapted to connect to a mating electrical socket member on the trailer (not shown) to provide an electrical connection between the trailer's electrical system and the truck's electrical system.

Figure 2:
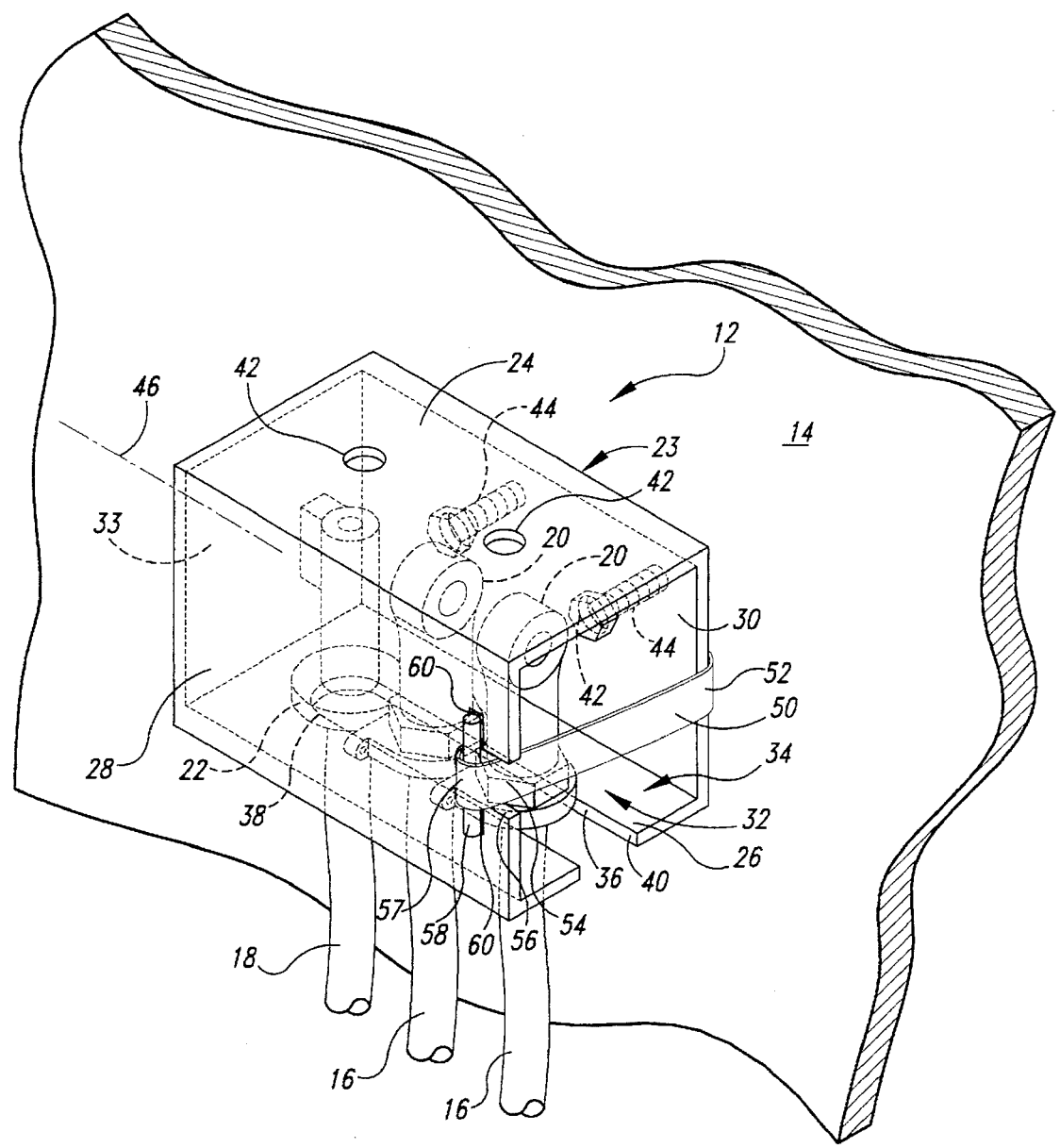
FIG. 2 is an enlarged isometric view of the storage device of FIG. 1 with the gladhands and electrical connector shown in hidden lines.

The storage device 12 removably receives the gladhands 20 and plug 22 therein when separated from the trailer to store and protect the gladhands and plug during operation of the truck cab 10. As best seen in FIG. 2, the storage device 12 has a generally boxlike housing 23 with top and bottom sides 24 and 26 that are spaced apart from each other, and left and right sides 28 and 30 that are spaced apart from each other and that extend between the top and bottom sides. The top, bottom, left, and right sides 24, 26, 28, and 30, respectively, define an interior area 32 of the housing 23 that is sized to contain the gladhands 20 and plug 22 therein, such that the housing protects the gladhands and plug while in the stored position. The housing 23 also includes a back wall 33 that extends between the top and bottom sides 24 and 26 and between the left and right sides 28 and 30 to provide a housing having a closed back end. The housing 23 also has an open front side 34 through which the gladhands 20 and plug 22 pass as they are moved into or out of the interior area 32.

An elongated slot 36 having a closed back end 38 and an open front end 40 is formed in the bottom side 26 of the housing. The back end 38 of the slot 36 is located adjacent to the back sidewall 33, and the slot extends to the open front side 34. The open front end 40 of the slot 36 communicates with the open front side 34 of the housing 23 such that the pneumatic and electrical lines 16 and 18 can be moved into the slot through the open front side when the gladhands 20 and electrical connector 22 are moved into the housing's interior area 32. The slot 36 has a width that is greater than the width of the pneumatic and electrical lines 16 and 18, but the width is smaller than the widths of the gladhands 20 and the plug 22. When the gladhands 20 and plug 22 are in the housing 23, the pneumatic and electrical lines 16 and 18 extend through the slot 36. The bottom side 26 of the housing 23 blocks the gladhands 20 and plug 22 from falling through the slot 36, thereby retaining the gladhands and plug within the interior area 32 of the housing.

The gladhands 20 and plug 22 are moved into the interior area 32 of the housing 23 by moving the gladhands and plug through the open front side 34 into the interior area toward the back wall 33 and passing the pneumatic and electrical lines 16 and 18 through the slot 36. The size of the interior area 32 and the length of the slot 36 are such that the two gladhands 20 and the plug 22 fit within the interior area of the housing 23, and portions of the pneumatic and electrical lines 16 and 18 are positioned within the slot and extend away from the interior area. The gladhands 20 and plug 22 are each removed from the housing 23 by moving the respective gladhand or plug away from the backwall 33 and through the open side 34, and the respective pneumatic or electrical line 16 or 18 is moved along the length of the slot 36 away from the closed back end 38 of the slot and through the open front end 40. In the preferred embodiment, the housing is a unitary structure with the top side 24, bottom side 26, left side 28, right side 30, and back wall 33 being integrally connected and formed of a substantially rigid and durable material, such as plastic, metal, or the like, that will provide protection to the gladhands 20 and plug 22 during operation of the truck.

As best seen in FIG. 2, each of the top side 24 and the right side 30 has a pair of mounting apertures 42 therein that are sized to receive fasteners 44 which securely connect to the truck's mounting surface 14. In the illustrated embodiment, the mounting surface 14 is substantially vertical, and the fasteners 44 extend through the mounting apertures on the housing's right side 30 to securely connect the housing to the mounting surface. Accordingly, a longitudinal axis 46 of the housing, which extends parallel to the slot 36 and through the open front side 34, is substantially horizontal. Although the illustrated embodiment has the longitudinal axis 46 horizontally oriented, the fasteners 44 can be connected to the vertical mounting surface 14 to orient the housing 23 with the longitudinal axis 46 being oriented at other angles, such as being angled upwardly or even substantially vertical with the open front side 34 of the housing facing upwardly.

Figure 3:
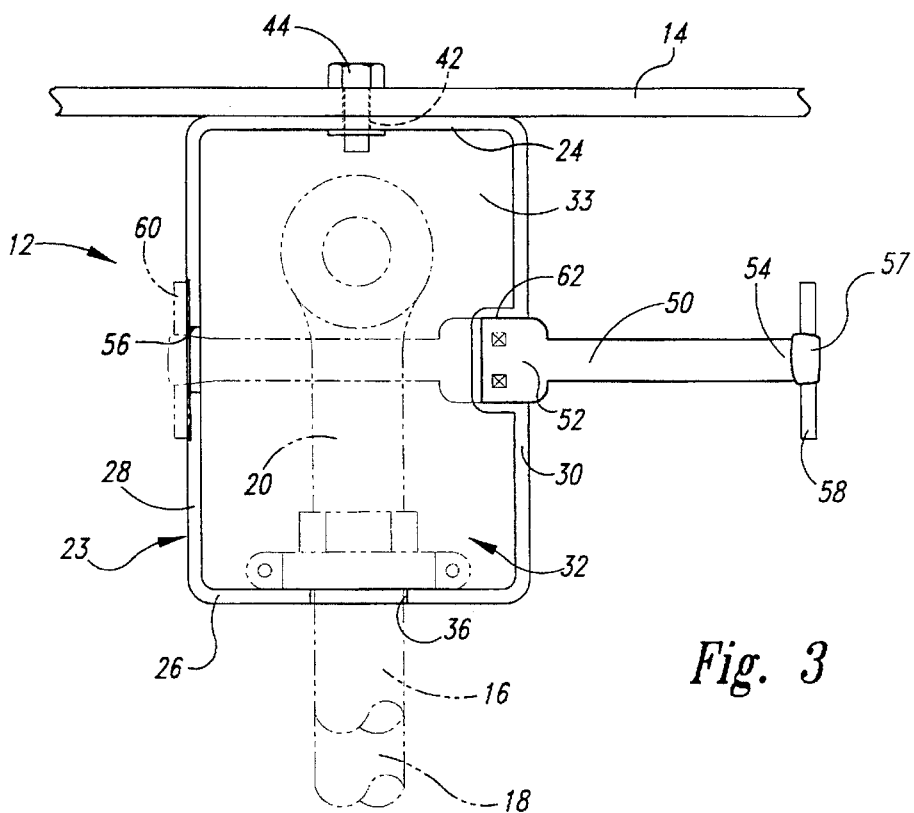
FIG. 3 is a reduced, front-side elevation view of the storage device of FIG. 2 mounted to a generally horizontal mounting surface of the truck cab.

As best seen in FIG. 3, the storage device 12 is also mountable to a substantially horizontal mounting surface with the fasteners 44 extending through the mounting apertures 42 on the top side 24 of the housing 23 and being securely attached to the horizontal mounting surface. In this configuration, the longitudinal axis 46 of the housing 23 remains substantially horizontal. Although the embodiments discussed above are described as being mountable to vertical or horizontal surfaces, the storage device can be mounted to mounting surfaces having different angular orientations.

As best seen in FIGS. 2 and 3, the storage device 12 includes a retaining strap 50 that is attached at a first end 52 to the fight side 30 of the housing. The retaining strap 50 is movable between an open position, shown in solid lines in FIG. 3, and a closed position, shown in solid lines in FIG. 2. In the open position, the retaining strap 50 does not extend across the housing's open front side 34 and the gladhands 20 or electrical connector 22 can be moved into or out of the interior area 32. In the closed position, the retaining strap 50 extends across the housing's open front side 34 and releasably connects at its free end 54 to the housing's left side 28. The retaining strap 50 is an elastomeric member, such as rubber or the like, that is partially stretched when the strap is in the closed position.

The free end 54 of the strap 50 is releasably retained in a notch 56 formed in the housing's left side 28 adjacent to the open front side. The free end 54 of the strap includes a head portion 57 and a locking pin 58 extending through the head portion. The locking pin 58 has a length greater than the width of the notch 56. When the free end 54 is positioned in the notch 56, the locking pin 58 extends beyond the edges of the notch and engages the left sidewall so as to hold the strap 50 in the closed position. The partially stretched retaining strap 50, when in the closed position, provides a biasing force that urges the locking pin 58 against the left side 28 to securely retain the retaining strap in the closed position. In this closed position, the retaining strap 50 blocks and prevents the gladhands 20 and the plug 22 from moving out of the interior area 32 of the housing 23.

In the preferred embodiment, the left side 28 of the housing 12 has a pair of depressions 60 adjacent to the notch 56 that are shaped and sized to removably receive the end portions of the locking pin 58 to prevent the inadvertent disengagement of the strap's free end 54 from the left side 28. The retaining strap 50 is moved from the closed position to the open position by pulling axially on the free end 54 of the strap to move the locking pin 58 out of the depressions 60 and pivoting the retaining strap about the first end 52 and away from the open front side 34 of the housing. When the strap 50 is in the open position, the gladhands 20 and plug 22 are movable into or out of the housing 23 and the pneumatic lines 16 and electrical line 18 are movable into or out of the slot 36.

As best seen in FIG. 3, the left side 28 of the housing 23 has a recessed area 62 adjacent to the open front side 34, and the recessed area contains the first end 52 of the retaining strap 50 in an inward location. The first end 52 of the retaining strap 50 is secured to the left side 28 within the recessed area 62 by conventional fasteners such that the outermost surface of the retaining strap's first end is flush with or recessed from the plane defined by the housing's lea side 28. The recessed positioning of the strap's first end 52 allows the housing 23 to be mounted flush to a generally flat mounting surface 14.

Although the retaining strap 50 disclosed for illustrative purposes is a rubber strap having the locking pin 58 at the free end 54, other suitable straps or retaining devices, such as a retaining door, may be used to extend across the open front side of the housing to retain the gladhands and electrical plug within the housing.

The storage device 12 allows the gladhands 20 and plug 22 to be quickly and easily stored and protected. The gladhands are disconnected from the mating connector of the trailer and moved through the open front side 34 of the housing 23 toward the housing's back wall 33. The pneumatic lines 16 are moved through the open front end 40 of the slot 36 and toward the slot's back end 38. Accordingly, the gladhands 20 are stored and protected within the interior area 32, and the pneumatic lines 16 extend from the gladhand through the slot 36 and away from the interior area. The electrical plug 22 is disconnected from the mating electrical connector of a trailer, and the plug 22 is moved into the housing 23 through the open front side 34. The electrical line 18 is moved through the open front end 40 of the slot 36 toward the slot's back end 38, and the electrical line extends from the plug through the slot and away from the interior area of the housing.

While various embodiments of the gladhand and electrical connector holder in accordance with the present invention have been described herein for illustrative purposes, the claims are not limited to the embodiments described herein. Equivalent devices may be substituted for those described, which operate according to the principles of the present invention and thus fall within the scope of the following claims. Therefore, it is expressly to be understood that modifications and variations made to the gladhand and electrical connector holder of the present invention may be practiced while remaining within the spirit and scope of the invention as defined by the following claims.

I claim:

1. A gladhand holder mountable to a vehicle, the vehicle having at least one hose and a gladhand on an end of the hose, comprising:

a housing having first and second sidewalls spaced apart from each other, and third and fourth sidewalls spaced apart from each other and extending between said first and second sidewalls, said first, second, third and fourth sidewall defining an interior area of said housing that is sized to contain the gladhand therein, said housing having an open side providing access to said interior area, said first sidewall having an elongated slot therein that has an open end at said open side, said slot being positioned to receive the hose therein when the gladhand is in said interior area, said slot having a width that is smaller than the gladhand so the gladhand is removably retained within said interior area; and a retaining member coupled to said housing and movably positioned across said open side to prevent the gladhand from moving out of said interior area through said open side.

2. The gladhand holder of claim 1 wherein said housing has a fifth sidewall extending between said first and second sidewalls and between said third and forth sidewalls, said fifth sidewall being opposite said open side.

3. The gladhand holder of claim 1 wherein said second sidewall has a mounting aperture therein.

4. The gladhand holder of claim 1 wherein said third sidewall has a mounting aperture therein.

5. The gladhand holder of claim 1 wherein each of said second and third sidewalls have a mounting aperture therein.

6. The gladhand holder of claim 1 wherein said retaining member is an elastomeric strap.

7. The gladhand holder of claim 6 wherein said elastomeric strap is connected to said third wall substantially adjacent to said open side and removably connected to said fourth wall substantially adjacent to said open side, said elastomeric strap being movable between closed and open positions, said strap extending across said open side and being connected to said fourth side when in said closed position, and said strap being positioned away from said open side when in said open position.

8. The gladhand holder of claim 6 wherein said fourth sidewall has a notch therein and said elastomeric strap extends between said third and fourth sidewalls, and an end of said elastomeric strap is releasably positionable in said notch.

9. A storage device for storing a gladhand and an electrical connector of a vehicle, the vehicle having a hose with the gladhand thereon, and having an electrical line with the electrical connector thereon, comprising:

a housing having a plurality of sidewalls defining a storage area sized to receive the gladhand and the electrical connector therein, said housing having an open end portion providing access to said storage area, one of said plurality of sidewalls having an elongated slot therein, said slot being sized to receive a portion of the hose and a portion of the electrical line when the gladhand and electrical connector are in said storage area, said slot having an open receiving end at said open end portion of said housing to allow the hose and electrical line to move into and out of said slot, said slot having a width dimension that is smaller than the gladhand and the electrical connector to prevent either of the gladhand or the electrical connector from moving through said slot; and a retaining device connected to said housing to removably retain the gladhand and the electrical connector in the storage area.

10. The storage device of claim 9 wherein said housing has mounting portions to mount said housing onto the vehicle.

11. The storage device of claim 9 wherein said housing has a mounting portion and a longitudinal axis extending parallel to said slot and through said open end portion, said mounting portion being mountable to the vehicle with said longitudinal axis being substantially horizontal.

12. The storage device of claim 9 wherein said retaining member is an elastomeric strap that extends across said open end portion, said strap being connected at a first end to the housing on a first side of said open end portion and being releasably connected at a second end to said housing on a second side of said open end portion spaced apart from said first side.

13. The storage device of claim 12 wherein said housing has a notch therein adjacent to said second side of said opening, and said second end of said elastomeric strap is releasably positionable in said notch.

14. A storage device for storing a gladhand of a vehicle, the vehicle having a hose with the gladhand thereon, comprising:

a housing having a plurality of sidewalls defining a storage area sized to receive the gladhand therein, said housing having an open end portion, one of said plurality of sidewalls having an elongated slot therein, said slot having an open receiving end at said open end portion of said housing, said slot having a width that is sized to receive a portion of the hose and that is smaller than the gladhand; and a retaining device connected to said housing to removably retain the gladhand in the storage area.

15. A method of storing a gladhand and air hose assembly of a truck, the air hose being connected to the vehicle and the gladhand being removably connected to a mating connector on a trailer towable by the truck, the vehicle having a gladhand storage device mounted thereon, the storage device including a housing having an open end that provides access to an interior area defined by the housing, and the housing including a slot therein that connects to the open end to provide access to the slot, comprising the steps of:

disconnecting the gladhand from the mating connector; and moving the gladhand into the housing through the open end and moving the hose along the slot to position the gladhand within the interior area of the housing, the hose extending from the gladhand through the slot and away from the interior area of the housing.

16. The method of claim 15, further comprising the step of blocking the open side with a releasable retaining member that prevents the gladhand from moving out of the interior area of the housing.

17. The method of claim 15, adapted for use with a truck that includes an electrical connector and line assembly that is removably connected to a mating electrical connector on the trailer, further comprising the steps of.

disconnecting the electrical connector from the mating electrical connector; and moving the electrical connector into the housing through the open end and moving the electrical line along the slot to position the electrical connector within the interior area of the housing, the electrical line extending from the electrical connector through the slot and away from the interior area of the housing.

* * * * *